United States Patent [19]
Phillips et al.

[11] Patent Number: 5,902,442
[45] Date of Patent: May 11, 1999

[54] METHOD FOR BONDING LIGNOCELLULOSIC MATERIAL WITH PHENOL-FORMALDEHYDE RESIN AND CARBON DIOXIDE

[75] Inventors: Earl K. Phillips, Springfield; William D. Detlefsen, Eugene; Lewis D. Creel, Dexter, all of Oreg.

[73] Assignee: Borden Chemical, Inc., Columbus, Ohio

[21] Appl. No.: 08/487,552

[22] Filed: Jun. 7, 1995

Related U.S. Application Data

[62] Division of application No. 08/063,158, May 17, 1993.

[51] Int. Cl.$^6$ .............................. B27N 3/00; B32B 31/12
[52] U.S. Cl. .................. 156/296; 156/307.1; 156/307.3; 156/307.4; 156/335; 264/83; 264/109
[58] Field of Search .................... 156/296, 307.1, 156/307.3, 307.4, 307.7, 312, 335; 264/82, 83, 109, 128; 100/38, 73, 93 P, 315; 162/224, 225, 226, 227

[56] References Cited

U.S. PATENT DOCUMENTS

| | | | |
|---|---|---|---|
| 2,757,150 | 7/1956 | Heritage | 260/17.2 |
| 3,303,089 | 2/1967 | Roubicek | 162/225 |
| 3,522,128 | 7/1970 | Orth | 156/335 |
| 3,637,547 | 1/1972 | Orth | 260/17.2 |
| 3,891,738 | 6/1975 | Shen | 264/101 |
| 4,122,236 | 10/1978 | Holman | 156/62.2 |
| 4,283,319 | 8/1981 | Konii et al. | 260/29.3 |
| 4,362,203 | 12/1982 | Konii et al. | 164/16 |
| 4,393,019 | 7/1983 | Geimer | 264/83 |
| 4,802,837 | 2/1989 | Held | 425/230 |
| 4,937,024 | 6/1990 | Hickson | 264/83 |
| 4,977,209 | 12/1990 | Barker et al. | 524/594 |
| 5,096,409 | 3/1992 | Stofko | 425/411 |
| 5,171,496 | 12/1992 | Hsu | 264/82 |
| 5,294,648 | 3/1994 | Smith et al. | 523/145 |

FOREIGN PATENT DOCUMENTS

| | | |
|---|---|---|
| 22974 | 8/1990 | Australia . |
| 1550874 | 11/1986 | France . |
| 0287172 | 1/1992 | German Dem. Rep. . |
| 301284 | 6/1971 | U.S.S.R. . |
| 1374332 | 11/1974 | United Kingdom . |
| 2007143 | 5/1979 | United Kingdom . |

OTHER PUBLICATIONS

Translation of German Patent 297172.
Abstract for DD 2977172.

*Primary Examiner*—Steven D. Maki
*Attorney, Agent, or Firm*—Stevens, Davis, Miller & Mosher, L.L.P.

[57] ABSTRACT

Subjecting lignocellulosic components coated with an aqueous alkaline phenolic resole resin solution to carbon dioxide inhibits overpenetration of resin and improves bond strength when the coated components are heated to cure the resin by application of steam and pressure in the preparation of structural panels. Also, contact with carbon dioxide of high moisture resin coated lignocellulosic components accelerates the speed of cure and improves bond strength of panels cured under heat and pressure.

20 Claims, 1 Drawing Sheet

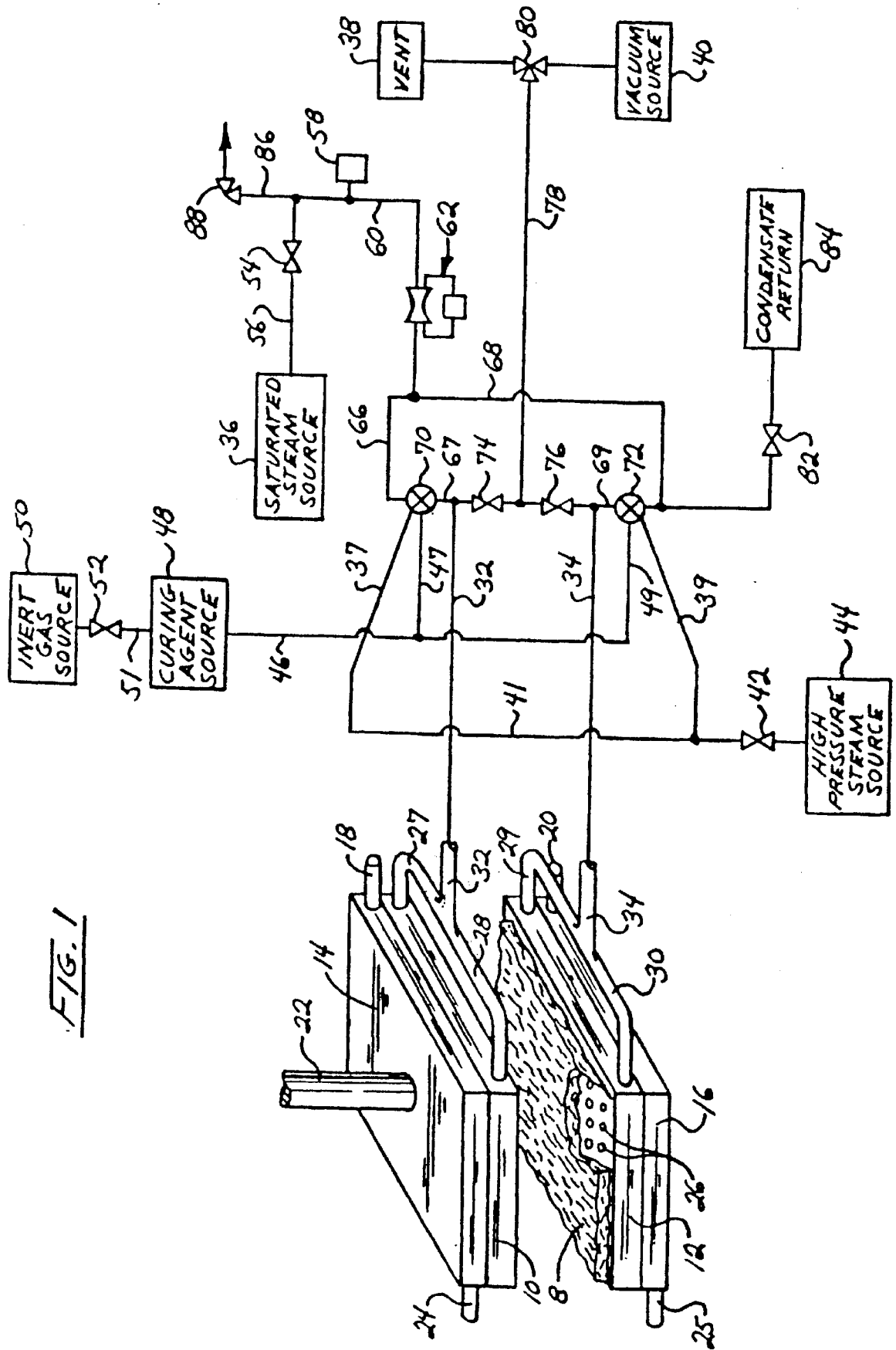

METHOD FOR BONDING LIGNOCELLULOSIC MATERIAL WITH PHENOL-FORMALDEHYDE RESIN AND CARBON DIOXIDE

This is a division of application Ser. No. 08/063,158, filed May 17, 1993.

BACKGROUND OF THE INVENTION

1. Field of the Invention

This invention relates to a method for bonding lignocellulosic material with an aqueous alkaline solution of a phenolic resole resin for the manufacture of structural panels under heat and pressure.

2. Prior Art

Panel products which use phenol-formaldehyde resole resins as binders for lignocellulosic materials are usually manufactured in a hot press which is heated by steam, hot oil, or electricity. In the production of such panels, a phenolic binder, e.g. phenol-formaldehyde resin, is applied to cellulose components such as chips or veneers to form a mat or to otherwise consolidate the components. The consolidated components, also referred to as a mat herein, are then placed between two heated platens and pressed into the composite panels. Conventionally, during pressing, heat is supplied to the mat to plasticize it, thereby making the mat easier to compress and also to cure the thermosetting binder. The time spent in pressing is the major bottleneck in the production of such panels.

The panels can be cured more rapidly by injecting steam into the lignocellulosic mat to heat the resin. This heats the board by injecting steam directly into the board through openings in the press platens. Steam injection press cycle times are generally much shorter than with conventional pressing times since the heat transfer into the board is almost instantaneous.

Liquid phenol-formaldehyde resins do not perform well in steam injection presses, except possibly in a process for making fiberboard. In fiberboard, the wood particles are very small and pliable. It is possible that when phenolic resin is used in steam injection pressed fiberboard the resin saturates the wood and is still available at the wood surface for bonding. When larger wood particles are used the effect is different. Steam injection pressing yields panels that have delaminations in areas that show a loss of the phenolic resin. One explanation for this effect is the penetration of resin into the wood surface in the zone where steam condensate dilutes the resin before there is enough heat to start resin gelation, or thickening. Such penetration diminishes the amount of resin available on the surface of the cellulose components for binding the components and results in poor bonds. This overpenetration is also referred to as "washout" herein. By the time the zone subjected to washout does see enough heat to cure the resin, it is no longer at the wood surface to act as a binder.

Overpenetration of the resin is also a problem with resin coated components of lignocellulosic material when the moisture content is high even when the panel is cured by conventional heated platens without the use of steam injection.

At the present time, the thermoset binders used commercially in steam injection press operations are urea formaldehyde and polymeric isocyanate. Urea resins are not durable and are not used to manufacture exterior panels. Isocyanate is a very efficient and durable binder, but is marked by high cost and health questions. Isocyanate binders also require the use of expensive release agents since they bond wood to metal as well as wood to wood.

Other processes disclosed in the literature use certain gaseous esters, acids, bases, or amines as catalysts when using steam injection of lignocellusosic components coated with phenolic resole resins. However, the use of such catalysts suffer from a number of shortcomings such as: high cost for the catalyst; the need for means to scavenge or recover excess catalyst; many such catalysts are detrimental to health and environment; they can cause unduly rapid cure; have a deleterious effect on the panel; and can have little or no effect on the overpenetration of resin into the cellulosic components.

The use of alkali metal carbonates is well known for thickening phenolic resole resins and accelerating their cure. Such carbonates are applied in solution, such as with water, to the resin before it is applied to the cellulosic components. There are a number of disadvantages to such applications such as increase in viscosity of the resin prior to being applied to the components due to the action of the alkali metal carbonate, non-uniform application of the alkali metal carbonate, and the introduction of additional water to the components.

A prior art document, specifically an English abstract of Soviet Union patent SU 301284-S which has a publication date of Oct. 13, 1969 and is assigned to Leningrad SM, discloses mixing wood chips with a binder, molding the mixture to form a board, treating the surface of the board with a solution of potassium carbonate, and then subjecting the board to hot pressing. It is alleged that such board has improved physico-mechanical properties and that good flameproofing effects are achieved. Although the English abstract from which this information is obtained does not disclose the type of binder used, it is not seen that this reference obviates applicants' invention since, among other reasons, the carbonate is applied as a solution to the surface of the board.

It has now been found that subjecting lignocellulosic components coated with an aqueous alkaline phenolic resole resin solution to gaseous carbon dioxide inhibits overpenetration of resin, increases bond strength and prevents delamination of the finished panel due to application of steam to the components during steam heating and subsequent cure in the preparation of structural panels. The advantages of subjecting the resin coated cellulose components to carbon dioxide is also evident when forming panels on conventional heated platens without steam injection. This is particularly the case when the components have a high moisture content.

SUMMARY OF THE INVENTION

In one aspect of the invention, lignocellulosic components to which an aqueous alkaline resole resin solution has been applied are gassed with carbon dioxide and then cured under heat and pressure in the manufacture of panels.

In another aspect of the invention, lignocellulosic components to which an aqueous alkaline phenolic resole resin solution has been applied are gassed with carbon dioxide and then cured under heat and pressure wherein at least a portion of the heat is supplied by steam in the manufacture of panels.

In still another aspect of this invention, a mat of lignocellulosic components coated with an aqueous phenolic resole resin solution is placed between platens of a press wherein at least one of said platens has perforations on its face opposing the other platen for the passage of a gas through said perforations, compressing the mat between the platens while the platens are heated to a temperature above 100° C. and injecting carbon dioxide or carbon dioxide and steam in various sequences and combinations into said mat to gel the resin and cure it with heat and pressure.

In a still further aspect of the invention, is disclosed a method for the production of lignocellulosic panels by bonding lignocellulosic components in the form selected from the group consisting of chips, wafers, strands, veneers and mixtures of chips, wafers and strands, which comprises applying an aqueous alkaline phenolic resole resin solution onto said components in an amount sufficient to coat said components; dry-laying said coated components; consolidating said coated components under pressure and, contacting said coated consolidated components with carbon dioxide and then subjecting said components so treated to heat and pressure to cure the resin and bond said components into a panel and wherein the quantity of carbon dioxide which contacts said components is at least 1% based on the weight of solids in said resin and sufficient to increase the viscosity of said resin by 10–500% to inhibit overpenetration of the resin into said components and to lower the pH of said aqueous alkaline phenolic resole resin solution to a pH not less than a pH of 7.

The carbon dioxide thickens the resin but does not cure it without application of heat. Thickening of the resin inhibits overpenetration of the resin when cured by steam injection or when the cellulosic components have a high moisture content.

BRIEF DESCRIPTION OF THE DRAWINGS

FIG. 1 is a schematic diagram showing the elements in the gassing system of one embodiment of this invention.

DETAILED DESCRIPTION OF THE INVENTION

FIG. 1 is a schematic depiction of one embodiment of the pressing system used in this invention. It shows a pair of press platens 10, 12 spaced from each other with an opening therebetween. Typically, press platens are large, substantially flat metal plates fixed to a supporting structure, and have internal conduits for the flow of gas. The platens are constructed and incorporated into a hot pressing system substantially according to known methods. One or both platens of an opposing pair are movable toward and away from each other in order to open and close the press. When the press is open, the mat 8 of composite material, comprising the composite components or veneers coated with the phenolic resin binder, is inserted into the press through known loading means (not shown) and deposited atop the bottom platen 12. Typically, platens are opened and closed through suitable closure means using hydraulic cylinders such as ram 22 of a cylinder (not shown).

At an upstream forming station (not shown), the lignocellulosic components such as particles or veneers and phenolic resin are consolidated into a mat having the predetermined basis weight in order to provide a loosely compact mat 8 with the right bulk density for pressing into panels that will have a predetermined thickness and density. Platens 10, 12 can be heated by a pair of backup platens 14, 16 through which steam or hot oil flows by means of inlet pipes 18 and 20 and outlet pipes 24 and 25 respectively. These backup plates provide heat to the platens 10 and 12, and the temperatures of the platens 10 and 12 can vary from about room temperature to about 232° C. (450° F.) or preferably from about 149° C. (300° F.) to about 216° C. (420° F.). The opposed faces of platens 10, 12 are substantially identical and have a plurality of apertures 26 connected to gas source 32, 34 by means of manifolds 27, 28, 29, and 30 so that gas, by means of conduits (not shown) in platens 10, 12, flows through the apertures 26 of one or both of the platens into mat 8.

The various gasses, such as high pressure or saturated steam, and gaseous carbon dioxide, alone or in a carrier, are introduced into the mat 8 through valves 70 and 72 and lines 32, 34 and manifolds 27, 28, 29, and 30 from source 36 for the saturated steam; source 44 for the high pressure steam; source 48 for the carbon dioxide and source 50 for inert gas upon opening of valve 52.

The valving system serves to control the application of the gasses, the temperature of gas, its pressure at the mat surfaces and time duration. Temperature sensing means (not shown) control the temperature of the platens and gasses. The valving system, the press closure means and the steam or other gas system pressure can be controlled and programmed through a small computer or with the use of several microprocessors. The press closure means is functional to move backup platens 14 and 16 which in turn move platens 10 and 12 in a controlled manner from the open position to the fully closed position of the press with the ability to hold positions and vary the closure rates in order to carry out the steps of this invention. The closed position of the press is that position when the mat has been compressed to its final predetermined in-press thickness. The valving system also controls the venting and application of the vacuum to the surfaces of the mat. A saturated steam supply control valve 54 allows steam at a suitable predetermined temperature and pressure to enter the pressing system form source 36 through line 56. A suitable measuring device on line 60, indicated schematically at 58 serves to detect the pressure and temperature in order to properly control the steam source 36. Flow measurement means 62 detects the flow rate of the saturated steam in line 60. At the T-joint in line 60, saturated steam line 66, through valve 70 and gas line 67, line 32 and the manifolds, is directed to the top platen 12 through valve 72, gas line 69, line 34 and the manifolds 29 and 30. Gas valves 70 and 72 serve to open and close lines 66, 68 as well as lines 37, 47, 39, and 49 as various gasses are called for. Line 66, through valve 70 and line 67, flows into line 32, which is then divided at another T-joint and lines or manifolds 27 and 28 are directed to opposite sides of the upper platen 10. The top platen gas inlet temperature and pressure are measured by any suitable means (not shown). The platen temperature is also measured and controlled since it is maintained a few degrees hotter than the maximum injection temperature to prevent steam condensation in the platen.

Steam from line 68, through valve 72 and gas line 69, flows into line 34 which is likewise divided into separate flow lines or manifolds 29, 30 which are directed to opposite sides of bottom platen 12. Similarly, as with upper platen 10, the inlet gas temperature, pressure and platen temperature are detected for monitor control purposes and suitable signals sent to the process control system, Exhaust valves 74, 76 are controllable and when open, connect the platens to exhaust line 78 which is directed to a three-way valve 80 which is either open to vacuum source 40 or to atmosphere at 38.

Line 82 serves to divert condensate developed in the various gas lines which are controlled by valves 70, 72. Branching from steam line 60 after supply valve 54 is line 86 which leads to a pressure safety valve 76.

High pressure steam is also let into valves 70 and 72 which, in turn, eventually lead fluid into the upper and lower platens 10, 12 respectively, through branch lines 37 and 39 respectively, which branch off from line 41. The steam in line 41 is controlled through valve 42 at the high pressure steam source 44. The high pressure steam lines also have monitors, gauges, safety ball valves and are controlled with valve 42 by the control means (not shown).

Numeral 50 represents a carrier gas source such as saturated steam, high pressure steam, air or nitrogen which can pass through valve 52 into carbon dioxide source 48, where it picks up carbon dioxide and carries it into line 46. However, carbon dioxide from source 48 can be provided to the platen openings without the use of a carrier gas. Line 46 has a first T-joint with one arm going into upper platen valve 70 and eventually to the upper platen 10, and the second arm going into valve 72 and eventually into the lower platen 12. As with the other gasses introduced into the platens 10 and 12, the carbon dioxide or carbon dioxide together with a carrier gas such as steam is injected into the mat furnish 8 through apertures 26 of the upper and lower platens. Not shown in the carbon dioxide system are temperature, pressure, and safety valves which are controlled in much the same manner as described for the saturated steam system.

The press time of this invention is very short. In the case steam is used in heating the lignocellulosic mat, it can vary from about 20 seconds to 120 seconds, preferably 40 to 80 seconds for a three-quarter inch thick panel. Press time is defined herein as beginning when the mat has been compressed in the press to a density of 20 pounds per cubic foot or at the time steam is first injected if this occurs prior to reaching a density of 20 pounds per cubic foot. Preferably, steam is injected into the mat in conventional manner, such as prior to compression of the mat to a density of 27 pounds per cubic foot. Also, the final density of the mat and panel pressure is that which is conventional in the art of forming composite panels.

The following description further illustrates this invention for making a three-quarter inch thick composite panel with the use of gaseous carbon dioxide and steam. Round wood such as aspen, pine, etc. is milled into wafers or strands and dried in a drier with inlet temperature of 900° F. and outlet temperature of 600° F. There are normally three passes of the furnish components in the dryer with one minute total dwell. The average moisture of the components going into the dryer is 30% to 40% and coming out is 2% to 5%.

The lignocellulosic components are then sent to the blender for the phenolic resin solution application. The phenolic resin solution application is typically about 3.4%, applied as a fine mist and the sprayed components are transferred to the formers. The phenolic used can be CAS-COPHEN PB-53 which is 52% solids, has a viscosity of 150–250 cps at 25° C., a specific gravity of 1.235±0.005, and is manufactured by Borden, Inc. At the formers, the face layer is laid down and oriented in the machine direction, then the core is laid down and this is oriented in the cross machine direction, followed by the face oriented in the machine direction. The orientation can be mechanical or electrostatic. This layered mat, which may be compressed to a density of about 8 to about 20 pounds per cubic foot, is then sent to the press.

The mat is placed on the lower platen and the top platen is lowered to just before the final thickness is achieved, i.e., just to before the press stops are reached and at mat density of about 23 pounds per cubic foot. The platens are heated to a temperature of 227° C. (440° F.). Then low pressure steam of 1 or 2 atmospheres is injected into the mat through both the top and bottom platens for a period of about six seconds. The press is then brought to full stops, i.e. the final in-press thickness of the mat, which generally involves over 32 pounds of density per cubic foot, and a gaseous carbon dioxide heated to a temperature of about 110° C. is injected into the mat for about two seconds at a pressure sufficient to penetrate through the mat. The thickness of the mat is three-quarters of an inch at the full stops. Immediately following the carbon dioxide gassing, high pressure steam is applied at, for example 4 atmospheres for eight seconds. Then the pressure is reduced to just hold, without significantly affecting the mat thickness, at the stops, and a vacuum is applied for six seconds to remove a great deal of the steam and other gasses. The press is then opened and the board removed. The press time involved in this illustration is about 30 seconds.

The Phenolic Resole Resin

The phenolic resole resins used to bind the lignocellulosic material are those aqueous alkaline phenolic resole resins which are conventionally used in the manufacture of structural wood products. They may be obtained by the reaction of phenol, cresol, resorcinol, 3,5-xylenol, bisphenol-A or other substituted phenols or mixtures thereof with aldehydes such as formaldehyde, acetaldehyde or furaldehyde. The reaction of the phenol or phenol derivative with aldehyde for the phenolic resin used in this invention takes place in the presence of alkaline materials such as sodium or potassium hydroxide. The preferred resin is the condensation product of phenol and formaldehyde or wherein only a portion such as less than half of the phenol or formaldehyde is substituted with a phenol derivative or aldehyde.

Typically, the molar ratio of formaldehyde or other aldehyde to phenol or other phenol derivative in these phenolic resins is about 1.5:1 to 3:1 and preferably from about 1.8 to 2.5 moles of the aldehyde for each mole of the phenol or phenol derivative. The resin is in the form of an aqueous solution and preferably has an alkalinity content, i.e., contains a base, in the range of 0.5% to about 15%, preferably 1% to 12%, and particularly 2% to 8%, based on the weight of the resin solution, when the base is sodium hydroxide. Thus, the term "alkalinity content" is based on sodium hydroxide. When a different base is used, the alkalinity content is proportionally equivalent on a molar weight basis. For example, to attain a 4% sodium hydroxide equivalent weight alkalinity content, it requires 4 grams of sodium hydroxide in 100 grams of resin solution, but 5.61 grams of potassium hydroxide in 100 grams of the resin are required to attain the same alkalinity content. Additional base can be added to a commercial resole resin in order to bring it to the desired alkalinity content. The base used for preparing the phenolic resin as well as additional base which may be added is generally that of an alkali metal such as sodium or potassium hydroxide. However, this invention should be effective with a wide variety of phenol formaldehyde resin types. These include the obvious strandboard or plywood phenolic resin as well as the less obvious glass binder, saturating or other industrial phenolic resins. However performance with the latter group, is not preferred.

The phenolic resin solution used in this invention will have a resin solids content of about 20% to 65% by weight preferably about 45% to 60%. Generally, the viscosity should be such as to permit the phenolic resin solution to be sprayed on the cellulosic components such as flakes or strands or to otherwise be applied to the components such as veneer. Thus, the viscosity will generally vary from about 50 to about 1,000 centipoise at 25° C. as determined by a Brookfield RVF viscosimeter with a number 2 spindle at 20 revolutions per minute at 25° C. and preferably from about 100 to 300 cps at 25° C.

A typical resin which can be used in this invention can be prepared as follows: To a clean reactor, charge 26 parts of phenol, 36.5 parts 50% formaldehyde in water, 17.5 parts water, and 6 parts 50% sodium hydroxide in water, all by weight. Heat the mixture to 90° C. and react to 500 cps Brookfield viscosity, when measured at 25° C. Cool to 75° C. and charge 6 parts of 50% sodium hydroxide. React to 600 cps at 25° C. Brookfield. Cool to room temperature. Charge 8 parts urea, and mix until dissolved. Finished specifications would be: 50% resin solids; 6% alkalinity; viscosity of 100–200 cps at 25° C.; and a molar ratio of 2.2 moles of formaldehyde for each mole of phenol.

The range of resin solids applied to the lignocellulosic components can vary from about 1% to 15% by weight of the lignocellulose depending of the quality of the panel product desired. Preferably, the amount of binder can vary from about 2% to about 8% of resin solids based on the weight of the lignocellulose being bound.

Carbon Dioxide

The carbon dioxide does two things in the process of this invention. First, as the phenolic resin absorbs carbon dioxide it reacts to form the carbonate anion. Since carbon dioxide forms carbonic acid on reaction with water, the carbonate formation is the result of a neutralization reaction, thereby reducing resin pH. As the pH drops in an alkaline phenolic resin, viscosity increases. This viscosity increase can occur even though resin molecular weight is not increasing significantly. Thus, the first effect of the carbon dioxide is to increase resin viscosity without crosslinking or curing the polymer. The second effect follows from the formation of the carbonate ion in the resin solution. Carbonates accelerate the cure of phenolic resole resins under heat and pressure. Thus, the second effect of the carbon dioxide is to accelerate or catalyze resin cure. The two effects are intertwined, but are distinctly different in mechanisms.

The cure of aqueous alkaline phenolic resole resins can be accelerated at a pH of about 2 or less. However, such low pH is deleterious to the final product. Small quantities of strong acid or large quantities of weak acids which do not get into a low pH such as that of below about a pH of 2 have little effect on accelerating the cure of the resole although they increase viscosity. Illustratively, although acetic acid lowers the pH of an alkaline phenolic resole resin, it does little and in fact can hinder the speed of cure and gluing properties since it causes a breakdown of the resin solution.

The use of carbon dioxide has the effect of slightly lowering the pH of the alkaline phenolic resole resin, e.g. by a pH value which does not bring the pH of the alkaline resin below 7. Carbon dioxide is not an acid nor a base. When dissolved in the resin it does form a weak acid as it reacts with water. This acid in water would have a pH only a little less than 7, around 6.4. It is not this acidity that accelerates the resin but instead the formation of the carbonate salt of the acid that is effective.

The change in viscosity of the resin due to contact with the carbon dioxide can vary over a wide range such as that of a minimum of a viscosity increase of at least about 10% and preferably at least two fold or more such as five fold or more.

The change in pH of the resin due to contact with the carbon dioxide can also vary over a wide range such as that of at least about 0.2 pH units and preferably at least 0.4 pH units while as described earlier the pH of the resin after gassing with carbon dioxide does not fall below 7.

Carbon dioxide used in this invention need not be pure. Any gas may be used as long as it contains an appreciable quantity of carbon dioxide and has the pressure and flow rate necessary for contacting the resin coated components such as by passing through a mat of such components. The carbon dioxide can be used in its pure form or it can be injected with a gaseous diluent such as steam, nitrogen, air and the like over a wide range of proportions. Preferably the carbon dioxide is injected or otherwise contacts with the resin in its pure form or diluted to no less than about 20% by weight of carbon dioxide in the total of carrier gas and carbon dioxide.

The quantity of carbon dioxide applied to the lignocellulosic components can vary over a wide range such as that which is sufficient to accelerate curing of the resin coated components or increase the bond strength of the cured panel. The quantity can be as little as about 1% based on the weight of the resin solids and preferably at least 2%. Carbon dioxide in excess of that required for increasing the bond strength is not harmful to the process although it is preferred that the quantity be about what is needed to attain the improved bond strength. Thus, the quantity of the carbon dioxide applied to the resin coated components can be 20% or even 100% or more by weight of the resin solids. The pressure at which the gassing of carbon dioxide takes place is that which is sufficient to reach the resin such as resin coatings on components in a mat. Such pressure can vary such as from about 1 to 10 atmospheres and preferably from about 2 to 5 atmospheres.

Reaction of carbon dioxide with the resins of this invention will not provide cure over a reasonable period of time without heating of the resin. The carbon dioxide gels the resin but falls short of curing it without the use of heat. In this respect it differs from conventional hardeners in that at room temperature it does not cure the resin but simply thickens it and accelerates its cure on subsequent heating.

The carbon dioxide gas can be applied in various sequences such as after mild steaming together with or followed by pressure which is often used to compact the mat before curing, before steaming, together with the steam, or in another sequence to attain its resin thickening and cure accelerating function. The carbon dioxide is applied before washout of resin and generally this requires that the carbon dioxide be injected before curing or extensive steaming.

Moisture Content of Mat

The moisture content of the consolidated lignocellulosic components or the mat prior to any optional steaming in the press can be from about 3% to 17% by weight and preferably from about 7% to 12% by weight. This moisture content is made up by water preexisting in the lignocellulosic components plus that of the resin binder. In case the mat is injected with steam such as in the press, the moisture content of the mat includes additional moisture provided by the steam. The exact amount of moisture which causes overpenetration can vary but overpenetration problems often occur at moisture levels of at least about 10%, based on the weight of the resin coated components or mat.

Apparatus and Process

The apparatus and process described above in connection with the drawing can be used in preparation of the lignocellulosic panels with or without steaming by this invention. Alternatively, a mat containing the resin coated cellulose components can be gassed with the carbon dioxide by various means such as placing the mat in a confined area and subjecting it to the gas or otherwise supporting the mat while impregnating it with carbon dioxide.

Additives

Suitable additives can be used in coating the raw lignocellulosic material. Thus, from 0.25 to 3% by weight, based on the weight of the oven dry wood on the board product, of paraffin can added as an aqueous emulsion. Still further, from 5% to 20% by weight, based on the weight of the oven dry wood in the board product, of a suitable plasticizer may be included. Suitable plasticizers include glycol esters, glycerine esters, phosphate esters and the like.

Thickeners such as the various gums, starches, protein materials and clays may be used together with the resins. The resin can have additives dissolved therein. Illustratively urea and resorcinol can be added therein in order to decrease the viscosity of the resin. The quantity of such resin viscosity reducing agent can vary over a broad range such as from about 5% to 15% based on the weight of the resin and preferably from about 8% to 12% thereof. In addition to reducing viscosity, the urea also acts as a formaldehyde scavenger. In the case of phenol-formaldehyde reins the resin will also generally contain a small quantity of methanol, typically less than about 1% such as about 0.5% or less.

The Lignocellulosic Materials

The lignocellulosic materials which are the basic raw materials for the panels of this invention may be derived from a large number of natural sources. They may be derived, for example, from sugar cane bagasse, straw, cornstalks, and other waste vegetable matter. In particular however, they are derived form various species of wood in the form of wood fibers, chips, shavings, flakes, particles and veneers. These materials which are used to prepare the panels are referred to generally herein as lignocellulosic components. The manufactured products include hardboard, particleboard, fiberboard, waferboard, strandboard and the like as well as plywood, laminated veneer lumber or laminated wood particles. The internal bond strength of these products will be at least about 30 pounds per square inch (psi).

As is conventional in the art, the resin is applied to fibers, flakes, chips, strands and the like by various spraying techniques whereas it is generally applied to veneers by coaters. Resin applied to the lignocellulosic components is referred to herein as a coating even though it may be in the form of small resin particles such as atomized particles which do not form a continuous coating.

Briefly, in preferred processes of this invention lignocellulosic components, e.g., strands or veneer, to which resin has been applied are consolidated into a mat. The mat is introduced into a steam press and gaseous carbon dioxide is injected into the mat alone or together with steam. Since the mat is not completely compressed or compacted, the carbon dioxide can flow through the mat where it contacts the resin. The resin is then cured by pressure and heat from additional steam and steam together with heat from the platens. Since steam assists in compaction and compression of the mat, it may also be desirable to steam the mat and compress it to an intermediate density with the platens before gassing with the carbon dioxide. The addition of carbon dioxide and steam can be simultaneous or by sequential additions.

The steam injection press and process described above can also be used in the case the structural panel is produced without steaming. In such case the lignocellulosic components which have been subjected to resin, are preferably consolidated in the form of a mat, and subjected to carbon dioxide, in apparatus which has means for injection of gas and permits passage of the carbon dioxide through the mat. The components or mat can then be further consolidated and then placed in a conventional press for curing by application of heat and pressure such as from heated platens.

Advantages of the Invention

Advantages of this invention due to gassing with carbon dioxide, particularly in the case of steam injection heating of the consolidated components, include: minimization of delamination of the finished panels and better bond strength; the heat cure of the resin is accelerated; generally less cost is involved for production of panels since carbon dioxide is relatively inexpensive in comparison with many other catalysts or hardeners described in the prior art for use with steam heating; and there is no need to scavenge or capture the excess which is not consumed. The carbon dioxide increases the viscosity of the resin and thickens it prior to cure so as to prevent penetration of the resin in the wood since it is the heating which causes the curing whereas the carbon dioxide gels or thickens the resin. Another advantage of gassing with carbon dioxide is that the resin cure is easily made uniform throughout the consolidated components and there is no addition of water or other solvents to the components. This invention also permits the use of low viscosity resin which can be distributed easier on to the lignocellulosic components and better wets the loose components. Still another advantage is that lower application rates of the resin can be used. Accelerating the cure of an alkaline phenolic resole resin by use of carbon dioxide is believed to be unexpected since carbon dioxide lowers the alkaline pH but does not attain the low pH values such as those of about 2 or less required for acid catalysis. Indeed, carbon dioxide forms but a weakly acidic solution in pure water , e.g., pH of about 6.4, and in the aqueous alkaline solutions of phenolic resole resin used in this invention the pH is maintained in the alkaline range, i.e., above 7.

In order that those skilled in the art may more fully understand the invention presented herein, the following procedures and examples are set forth. All parts and percentages in the examples, as well as elsewhere in the application, are by weight.

Procedures and Examples

Gel Tests. The gel tests to determine gel time were conducted with a Gel Time Meter, Catalog No. 22 of Sunshine Scientific Instrument of 1810 Grant Avenue, Philadelphia, Pa. The gel-time meter essentially consists of a motor-driven, rotating spindle suspended in the test sample. The sample is maintained at constant temperature by a boiling bath surrounding the sample cell. In this case, the boiling bath was that of water so that the temperature was 100° C. At the gel point, the very pronounced increase in viscosity of the sample stops the rotating spindle, closing an electrical switch which actuates the timing and alarm circuits. In operation, the sample tube containing a 10 gram sample, and the spindle are placed in the briskly boiling water bath. At the same time, the power switch is turned on, starting the counter and the slowly rotating spindle device. The spindle is locked into the spindle drive by magnetic coupling. The test switch is turned on, setting up the automatic counter stop and alarm circuits. The instrument needs no further attention for the duration of the test. When the gel point is reached, the increased viscosity of the test sample stops the rotating spindle and the actuating switch is closed. This switch shuts off the spindle motor and the counter, and actuates the visible and audible signal. The gel time and the bath temperature are then recorded by the operator, and the test is complete.

EXAMPLE 1

To demonstrate the effect of carbon dioxide gas on phenolic resin viscosity and cure speed a simple experiment was run. A sample of CASCOPHEN 335J, an aqueous alkaline phenolic resole resin solution product of Borden, Inc. was used for the test. This resin is manufactured to 43% solids, a Brookfield viscosity of 500 cps, and a Sunshine boiling water gel of 20–30 minutes. The resin was diluted with water to a resin solids of 28%. One portion was sparged with carbon dioxide gas for a period of time. At the end of the sparging the resins were tested for viscosity and gel time. The results are shown below in Table 1A.

TABLE 1A

| Sample | Viscosity | Gel Time |
| --- | --- | --- |
| 1. 335J 43% solids | 500 cps | 20–25 minutes |
| 2. 335J 28% solids | 28 cps | 101 minutes |
| 3. 335J 28% solids $CO_2$ sparged | 1900 cps | 8.6 minutes |

Overnight, the above carbon dioxide sparged sample increased in viscosity to 4200 cps. This was then treated with urea/water mixture to reduce its viscosity. The samples having the reduced viscosity were then tested for boiling water gel time or simply gel time. The results are shown in Table 1B below.

TABLE 1B

| Sample | Viscosity | Gel Time |
| --- | --- | --- |
| 1. 1.5% water, and 1.5% urea added | 1600 cps | 9.1 minutes |
| 2. 2.5% water and 2.5% urea added | 600 cps | 9.7 minutes |
| 3. 5% water and 5% urea added | 150 cps | 11.2 minutes |

The above data show that the action of carbon dioxide gas on phenolic resin consists of two effects. First, carbon dioxide greatly increases the viscosity of the resin, even when it is diluted with water, as it would be in a steam injection press. Second, the formation of carbonate ion in the resin from the carbon dioxide gas greatly accelerates resin cure, again even in a diluted state. The data show this acceleration to be largely independent of the viscosity increase caused by the carbon dioxide gas.

EXAMPLE 2

This example illustrates the pH drop due to carbonation with gaseous carbon dioxide. Two aqueous alkaline phenolic resole resin samples were carbonated. In Sample 1, the measured resin alkalinity was 7% calculated as sodium hydroxide. Initial pH was 11.8. On carbonation the resin became very thick and insoluble and the carbonation was then stopped. The pH of this carbonated resin was 10.2 In Sample 2, the measured resin alkalinity was 1.5%. The initial pH was 9.6. This resin also became insoluble and thick more rapidly than the first. When carbonation was stopped, the pH was 9.2. It can be seen in this example that the carbon dioxide does not make the resin acid, but drops the resin pH to the point where the resin is no longer in water solution. Even though the resins became thick and insoluble, they were not cured by the carbon dioxide and could be resolubilized by addition of water and sodium hydroxide.

EXAMPLE 3

To demonstrate the accelerating effect of carbon dioxide, carbonated and non-carbonated resin coated lignocellulosic components were subjected to relatively short press cycle times to form panels. The internal bond strength of the panels was then measured. The results of this example are shown in TABLE 3.

In this example, aspen strands were placed in a rotary tumbler and coated with resin. Resin coated strands were removed from the tumbler and consolidated into 3 mats which were the controls set forth in TABLE 3 and designated as Mat 1C, Mat 2C, and Mat 3C.

The resin used for coating the strands was WS 473-81. This is an aqueous alkaline solution of a phenolic resole resin containing back added urea which is produced by Borden, Inc. Properties of this resin, as manufactured with the back added urea, were as follows: viscosity of 160 cps at 25° C.; 50% solids content; 6.7% alkalinity, 0.04% free formaldehyde; less than 0.1% of free phenol; a boiling water gel time of 31 minutes; and a formaldehyde to phenol mole ratio of 2.35:1. The urea content was 12.5% by weight of the resin.

Resin coated aspen strands prepared in the same manner as those used to make Mat 1, Mat 2, and Mat 3 were then subjected to carbon dioxide in the tumbler and tumbled. The resin coated strands were subjected to the carbon dioxide for about 15 minutes in order to contact all of the strands with the carbon dioxide. The carbonated, resin coated strands were then removed from the tumbler and consolidated to prepare Mat 4T, Mat 5T and Mat 6T of TABLE 3.

The non-carbonated control mats and the carbonated test mats were made into panels by placing the mats between platens heated to 400° F. of a conventional press and applying pressure through the heated platens. The target thickness of all the panels was three quarters of an inch. Other parameters of the pressing process and results obtained are shown in TABLE 3 wherein: the heating cycle (Cycle Min.) to which each mat was subjected is given in minutes and the finished board thickness (Thickness) is given in inches. TABLE 3 also gives the internal bond strength of each panel in pounds per square inch (PSI-IB); the percent water absorption of the panel (% W. A.); and the percent thickness swell (%T. S.).

A comparison of press cycle time with equivalent internal bond strength of the panels in TABLE 3 shows that subjecting the resin coated strands to carbonation resulted in press cycles of about 30 seconds shorter in comparison to the resin coated strands which were not carbonated.

TABLE 3

| Mat | Cycle (Min.) | Thickness (Inch) | Density (lbs/ft$^3$) | PSI-IB | % W.A. | % T.S. |
| --- | --- | --- | --- | --- | --- | --- |
| 1C | 5.50 | 0.754 | 41.02 | 36 | 76.2 | 26.2 |
| 2C | 5.00 | 0.813 | 38.12 | 5.3 | 70.1 | 32.4 |
| 3C | 4.75 | 0.818 | 37.96 | 9.7 | 72.3 | 31.4 |
| 4T | 5.00 | 0.768 | 40.28 | 28 | 74.5 | 30.1 |
| 5T | 4.50 | 0.803 | 38.65 | 10 | 75.6 | 32.4 |
| 6T | 4.25 | 0.816 | 37.86 | 8.0 | 78.8 | 29.5 |

While the invention has been described in connection with specific embodiments thereof, it will be understood that it is capable of further modifications This application is intended to cover any variations, uses or adaptations of the invention following, in general, the principals of the invention, and including such departures from the present disclosure as come within known and customary practice within the art to which the invention pertains.

What is claimed is:

1. A method for the production of lignocellulosic panels by bonding lignocellulosic components in the form selected from the group consisting of chips, wafers, strands, veneers and mixtures of chips, wafers and strands, which comprises applying an aqueous alkaline phenolic resole resin solution onto said components in an amount sufficient to coat said components; dry-laying said coated components; consolidating said coated components under pressure and, contacting said coated consolidated components with carbon dioxide and then subjecting said components so treated to heat and pressure to cure the resin and bond said components into a panel and wherein the quantity of carbon dioxide which contacts said components is at least 1% based on the weight of solids in said resin and sufficient to increase the viscosity of said resin by 10–500% to inhibit overpenetration of the resin into said components and to lower the pH of said aqueous alkaline phenolic resole resin solution to a pH not less than a pH of 7.

2. The method of claim 1 wherein the quantity of carbon dioxide is at least 2% by weight based on the weight of resin solids.

3. The method of claim 1 wherein the components comprise veneer.

4. The method of claim 1 wherein the resin contains from about 5% to 15% by weight of urea.

5. The method of claim 1 wherein the solution has an alkalinity content calculated as sodium hydroxide of between about 1 and 12 percent by weight of said solution.

6. The method of claim 1 wherein the resin coated components have a moisture content of at least 12% by weight thereof.

7. The method of claim 1 wherein at least a part of the heat for curing the resin is provided by subjecting the components to steam.

8. The method of claim 1 wherein the said components are selected from the group consisting of chips, wafers, strands, and mixtures thereof and the viscosity of the resin at the time of coating the components is from about 100 to 300 cps at 25° C.

9. The method of claim 1 wherein the resin is prepared by condensing about 1.5 moles of formaldehyde for each mole of phenol in the presence of an alkali metal hydroxide.

10. A method for the production of lignocellulosic panels having an internal bond strength of at least 30 pounds per square inch by bonding together lignocellulosic components with an adhesive binder, which binder is curable under heat and pressure; said lignocellulosic components selected from the group consisting of chips, wafers, strands, veneers and mixtures of chips, wafers and strands comprising:

A. applying to said components an adhesive binder that is curable upon the application of heat, wherein the binder comprises an alkaline phenolic resole resin solution, to form coated components, and thereafter dry-laying the components;

B. consolidating the coated components under pressure to increase the bulk density of the components;

C. contacting the thus consolidated components with at least 1% of carbon dioxide based on the weight of resin solids to reduce the pH of the alkaline resin solution to a pH not below neutral while simultaneously increasing the viscosity of resin to inhibit overpenetration of the resin into said components; and D. further subjecting the carbon dioxide treated, consolidated components, to heat and a pressure sufficient to densify said coated components for a time sufficient to cure the resin and bond the components to form a panel having an internal bond strength of at least 30 pounds per square inch.

11. The method of claim 10 wherein the components comprise strands.

12. The method of claim 10 wherein the components comprise veneer.

13. The method of claim 12 wherein the veneers is wood veneer for the manufacture of plywood.

14. The method of claim 10 wherein the solution has an alkalinity content calculated as sodium hydroxide between about 0.5 and 15 percent by weight and wherein at least a portion of the heat is supplied by steam injected into said mat.

15. The method of claim 10 wherein the quantity of carbon dioxide is sufficient to decrease the pH of the resin by at least 0.2 pH units.

16. The method of claim 10 wherein at least a portion of the heat is supplied by steam injected into the mat after contact of the mat with carbon dioxide.

17. The method of claim 10 wherein the coated components are first compacted by use of steam and pressure in a quantity insufficient to cure the resin, the compacted components are then subjected to the gas containing carbon dioxide and subsequently steam is applied together with pressure to cure the resin.

18. A method for manufacture of a lignocellulosic panel which comprises:

A. subjecting lignocellulosic components in the form selected from the group consisting of chips, wafer, strands, veneers and mixtures of chips, wafers and strands, to contact with an aqueous alkaline solution of a phenolic resole resin, dry-laying the coated components and effecting carbonation of said resin by contacting the coated components with carbon dioxide in an amount sufficient to reduce the pH of said resin to not less than a pH of 7 and thicken said resin to inhibit overpenetration of the resin in said components and insolublize the resin to accelerate the cure of the resin under subsequently applied heat and pressure to form carbonated components; and B. subsequently subjecting the carbonated resin and components having a moisture content of at least 10% by weight to heat and pressure between platens of a press heated at a temperature above 100° C. to cure the resin and form a panel.

19. The method of claim 18 wherein a portion of the moisture is supplied by injecting steam on the resin coated components while located between the platens.

20. The method of claim 18 wherein the moisture content of the resin coated components is at least about 10% by weight as the components are placed between the platens.

* * * * *